(12) United States Patent
Azuma et al.

(10) Patent No.: US 10,861,610 B2
(45) Date of Patent: Dec. 8, 2020

(54) ABNORMALITY DIAGNOSIS SYSTEM

(71) Applicant: MITSUBISHI HEAVY INDUSTRIES, LTD., Tokyo (JP)

(72) Inventors: Takashi Azuma, Tokyo (JP); Kenji Mashio, Tokyo (JP); Takae Yamashita, Tokyo (JP); Susumu Shiizuka, Tokyo (JP); Junichi Nishitani, Tokyo (JP); Masafumi Utsumi, Tokyo (JP); Jun Shibuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 471 days.

(21) Appl. No.: 15/575,591

(22) PCT Filed: May 6, 2016

(86) PCT No.: PCT/JP2016/063653
§ 371 (c)(1),
(2) Date: Nov. 20, 2017

(87) PCT Pub. No.: WO2017/051562
PCT Pub. Date: Mar. 30, 2017

(65) Prior Publication Data
US 2018/0158556 A1 Jun. 7, 2018

(30) Foreign Application Priority Data

Sep. 25, 2015 (JP) .................................. 2015-188603

(51) Int. Cl.
*G21D 3/04* (2006.01)
*G21C 17/00* (2006.01)
(Continued)

(52) U.S. Cl.
CPC ............. *G21D 3/04* (2013.01); *G05B 19/058* (2013.01); *G05B 19/4184* (2013.01);
(Continued)

(58) Field of Classification Search
CPC ........ G21D 3/04; G21D 3/06; G05B 19/4184; G05B 19/058; G05B 23/0254;
(Continued)

(56) References Cited

U.S. PATENT DOCUMENTS

2012/0166142 A1 6/2012 Maeda et al.
2012/0316835 A1 12/2012 Maeda et al.

FOREIGN PATENT DOCUMENTS

JP 6-187030 A 7/1994

OTHER PUBLICATIONS

Extended (Supplementary) European Search Report dated Mar. 27, 2019, issued in counterpart EP application 16848352.7 (8 pages).
(Continued)

*Primary Examiner* — Sujoy K Kundu
*Assistant Examiner* — L. Anderson
(74) *Attorney, Agent, or Firm* — Westerman, Hattori, Daniels & Adrian, LLP

(57) ABSTRACT

An abnormality diagnosis system for diagnosing an abnormality event in an atomic power generation plant on the basis of an abnormality indication detection result from an abnormality indication monitoring system is provided with an abnormality diagnosis control unit which acquires a parameter transition in a monitoring period from a non-detection timing to an indication detection timing, and a parameter contribution in the monitoring period and a database. The abnormality diagnosis control unit executes a matching determination between the parameter transition and parameter contribution that have been acquired from the abnormality indication monitoring system, and a parameter transition for determination and a parameter contribution for determination that have been stored in the database, and identifies an abnormality event and an abnormality indica-
(Continued)

tion facility that are associated with the parameter transition and parameter contribution determined to be matching.

6 Claims, 4 Drawing Sheets

(51) Int. Cl.
    *G06F 16/2455*     (2019.01)
    *G21D 3/06*     (2006.01)
    *G05B 19/418*     (2006.01)
    *G05B 19/05*     (2006.01)
    *G05B 23/02*     (2006.01)

(52) U.S. Cl.
    CPC ... *G05B 23/0254* (2013.01); *G06F 16/24558* (2019.01); *G21C 17/00* (2013.01); *G21D 3/06* (2013.01); *G05B 2219/161* (2013.01); *Y02E 30/30* (2013.01)

(58) Field of Classification Search
    CPC ........ G05B 2219/161; G06F 16/24558; G21C 17/00; Y02E 30/40
    See application file for complete search history.

(56) References Cited

OTHER PUBLICATIONS

International Search Report dated Jul. 19, 2016, issued in counterpart International Application No. PCT/JP2016/063653 (2 pages).

FIG. 3

| FIRST MEASUREMENT PARAMETER | SECOND MEASUREMENT PARAMETER |
|---|---|
| OO LINE OUTLET FLOW RATE | XX PUMP SHAFT RECEIVER TEMPERATURE |
| OO LINE OUTLET FLOW RATE | OO LINE INLET TEMPERATURE |
| OO LINE OUTLET FLOW RATE | YY LINE OUTLET TEMPERATURE |

FIG. 4

| FIRST MEASUREMENT PARAMETER | SECOND MEASUREMENT PARAMETER |
|---|---|
| OO LINE OUTLET FLOW RATE | XX PUMP SHAFT RECEIVER TEMPERATURE |
| OO LINE OUTLET FLOW RATE | OO LINE INLET TEMPERATURE |
| OO LINE INLET TEMPERATURE | XX PUMP SHAFT RECEIVER TEMPERATURE |
| XX PUMP SHAFT VIBRATION | OO LINE INJECTION FLOW RATE |
| OO LINE OUTLET FLOW RATE | YY LINE OUTLET TEMPERATURE |
| OO LINE INJECTION FLOW RATE | YY LINE OUTLET TEMPERATURE |

FIG. 5

| RANK | MEASUREMENT PARAMETER |
|---|---|
| 1 | ○○ LINE OUTLET FLOW RATE |
| 2 | XX PUMP SHAFT RECEIVER TEMPERATURE |
| 3 | ○○ LINE INLET TEMPERATURE |
| 4 | ○○ LINE INJECTION FLOW RATE |
| 5 | YY LINE OUTLET TEMPERATURE |
| 6 | XX PUMP SHAFT VIBRATION |

FIG. 6

| RANK | ABNORMALITY EVENT |
|---|---|
| 1 | EVENT A |
| 2 | EVENT C |
| 3 | EVENT B |

FIG. 7

| RANK | ABNORMALITY INDICATION FACILITY |
|---|---|
| 1 | XX PUMP |
| 2 | OO VALVE |
| 3 | YY HEAT EXCHANGER |

FIG. 8

| RANK | EVENT A ABNORMALITY COUNTERMEASURE |
|---|---|
| PLAN 1 | OO SWITCHING OPERATION |
| PLAN 2 | DECOMPOSITION INSPECTION |
| PLAN 3 | CHANGING OF SET VALUE OF OO |

FIG. 9

| MEASUREMENT PARAMETER |
|---|
| OO LINE OUTLET FLOW RATE |
| XX PUMP SHAFT RECEIVER TEMPERATURE |
| OO LINE INLET TEMPERATURE |
| YY LINE OUTLET TEMPERATURE |

ABNORMALITY DIAGNOSIS SYSTEM

TECHNICAL FIELD

The present invention relates to an abnormality diagnosis system diagnosing abnormality in a nuclear power plant.

BACKGROUND ART

In the related art, there is an abnormality diagnosis method of performing abnormality diagnosis for a control target by using a time-series model which is built on the basis of data which is input to and output from the control target (refer to PTL 1). In this abnormality diagnosis method, a normal model indicating a normal state of the control target and an abnormal model indicating an abnormal state of the control target are created in advance. A measured value of an output from the control target, an estimated value of an output from the normal model, and an estimated value of an output from the abnormal model are compared with each other, and thus abnormality diagnosis for the control target is performed.

CITATION LIST

Patent Literature

[PTL 1] Japanese Unexamined Patent Application Publication No. 6-187030

SUMMARY OF INVENTION

Technical Problem

Meanwhile, in a nuclear power plant, abnormality indication detection is performed as detection before reaching abnormality. Typically, detection of an abnormality indication of a nuclear power plant and abnormality diagnosis of the nuclear power plant are separately performed. Thus, it is hard to use a detection result of an abnormality indication for abnormality diagnosis for the nuclear power plant.

Therefore, an object of the present invention is to provide an abnormality diagnosis system which can specify an abnormality event of a nuclear power plant by detecting an abnormality indication of the nuclear power plant and by using a detection result of the abnormality indication and the past operation history of the nuclear power plant.

Solution to Problem

According to the present invention, there is provided an abnormality diagnosis system diagnosing an abnormality event of a nuclear power plant on the basis of abnormality indication detection results in an abnormality indication monitoring system which detects an abnormality indication of the nuclear power plant by using a correlation value indicating a correlation between a plurality of measurement parameters measured in the nuclear power plant, the abnormality diagnosis system including an abnormality diagnosis control unit that acquires a parameter transition which is a transition in a measurement parameter in which the correlation value is an abnormal value in a monitoring period from a non-detection timing to an indication detection timing, and a parameter contribution of the measurement parameter contributing to a change in a detection value for detecting an abnormality indication in the monitoring period, as the abnormality indication detection results, the indication detection timing being a time at which an abnormality indication is detected, and the non-detection timing being a time earlier than the indication detection timing; and a database that stores an abnormality event of the nuclear power plant, an abnormality indication facility correlated with the abnormality event, the parameter transition for determination which is generated on the basis of the past operation history of the nuclear power plant and is correlated with the abnormality event, and the parameter contribution for determination which is generated on the basis of the past operation history of the nuclear power plant and is correlated with the abnormality event, in which the abnormality diagnosis control unit determines whether or not the parameter transition and the parameter contribution included in the abnormality indication detection results acquired from the abnormality indication monitoring system respectively match the parameter transition and the parameter contribution stored in the database, and specifies an abnormality event and an abnormality indication facility correlated with the parameter transition and the parameter contribution determined as matching.

According to this configuration, it is possible to specify an abnormality event and an abnormality indication facility of a nuclear power plant by using an abnormality indication detection result from the abnormality indication monitoring system and the past operation history of the nuclear power plant.

Preferably, the database further stores an abnormality countermeasure correlated with the abnormality event, and the abnormality diagnosis control unit further specifies the abnormality countermeasure.

According to this configuration, the abnormality diagnosis control unit can specify an appropriate abnormality countermeasure for an abnormality event.

The abnormality diagnosis control unit preferably predicts the development of a plurality of measurement parameters after the indication detection timing on the basis of the specified abnormality event.

According to this configuration, the development of a plurality of measurement parameters is predicted, and thus it is possible to predict time until abnormality occurs in a nuclear power plant from detection of an abnormality indication of the nuclear power generation plant. Therefore, it is possible to take an abnormality countermeasure for a specified abnormality event at an appropriate time before abnormality occurs in the nuclear power plant.

Preferably, the abnormality diagnosis control unit outputs a centralized monitoring instruction signal for giving an instruction for centralized monitoring of the measurement parameter correlated with the specified abnormality event, to the abnormality indication monitoring system.

According to this configuration, the abnormality indication monitoring system can centrally monitor a measurement parameter correlated with an abnormality event, and can thus further enhance monitoring of the measurement parameter.

BRIEF DESCRIPTION OF DRAWINGS

FIG. 3 is a diagram illustrating a list of measurement parameters in which a correlation value is an abnormal value at a non-detection timing.

FIG. 4 is a diagram illustrating a list of measurement parameters in which a correlation value is an abnormal value at an indication detection timing.

FIG. 5 is a diagram illustrating a parameter contribution.

FIG. 6 is a diagram illustrating a plurality of specified abnormality events.

FIG. 7 is a diagram illustrating an abnormality indication facility.

FIG. 8 is a diagram illustrating an abnormality countermeasure.

FIG. 9 is a diagram illustrating a centralized monitoring instruction signal.

DESCRIPTION OF EMBODIMENTS

Hereinafter, an embodiment of the present invention will be described in detail with reference to the drawings. The invention is not limited to the embodiment. Constituent elements in the following embodiment include constituent elements which can be easily replaced by a person skilled in the art, or the substantially same constituent elements. Constituent elements described below may be combined with each other as appropriate, and, in a case where there are a plurality of embodiments, the embodiments may be combined with each other.

Embodiment

Figure 1:
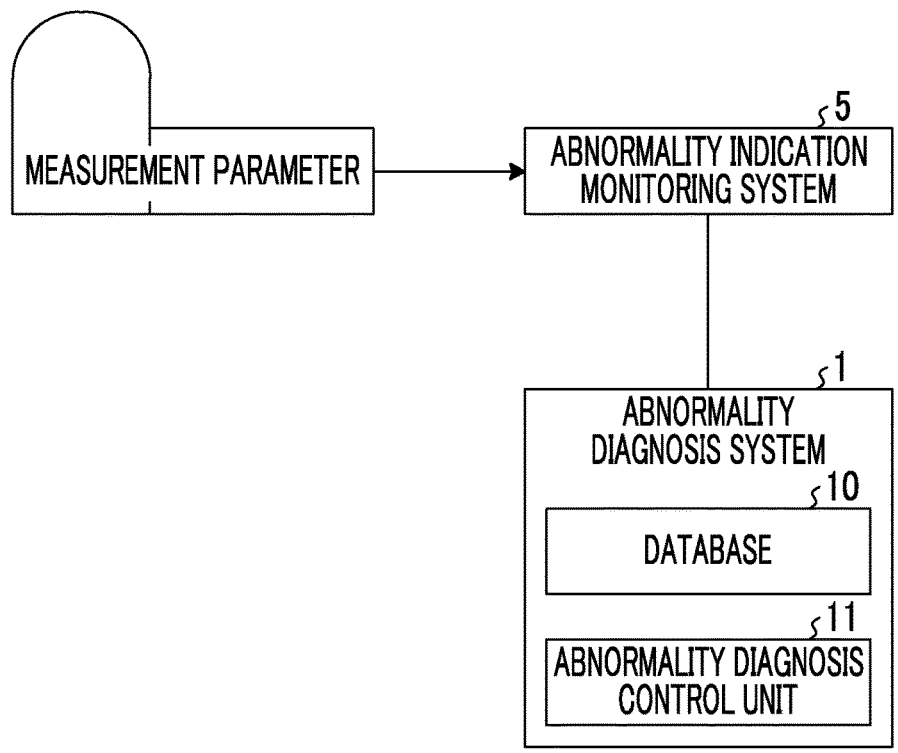
FIG. 1 is a schematic configuration diagram illustrating an abnormality diagnosis system according to the present embodiment.

FIG. 1 is a schematic configuration diagram illustrating an abnormality diagnosis system according to the present embodiment. As illustrated in FIG. 1, an abnormality diagnosis system 1 according to the present embodiment is a system which is connected to an abnormality indication monitoring system 5, acquires a detection result of an abnormality indication of a nuclear power plant, and diagnoses abnormality in the nuclear power plant on the basis of the acquired abnormality indication detection result. The abnormality diagnosis system 1 diagnoses abnormality in, for example, a nuclear power generation plant having a reactor as a nuclear power plant. First, with reference to FIG. 1, prior to a description of the abnormality diagnosis system 1, the abnormality indication monitoring system 5 will be described.

As illustrated in FIG. 1, the abnormality indication monitoring system 5 acquires a plurality of measurement parameters which are respectively output from a plurality of measurement machinery provided in the nuclear power generation plant as plant operation data. The abnormality indication monitoring system 5 detects an abnormality indication of the nuclear power generation plant on the basis of a correlation value indicating a correlation among the plurality of acquired measurement parameters. Specifically, the abnormality indication monitoring system 5 derives correlation values respectively indicating correlation strengths of two measurement parameters among a plurality of measurement parameters. The abnormality indication monitoring system 5 uses a correlation value obtained by adding all the derived correlation values of the measurement parameters together, as a monitoring indicative value.

Figure 2:
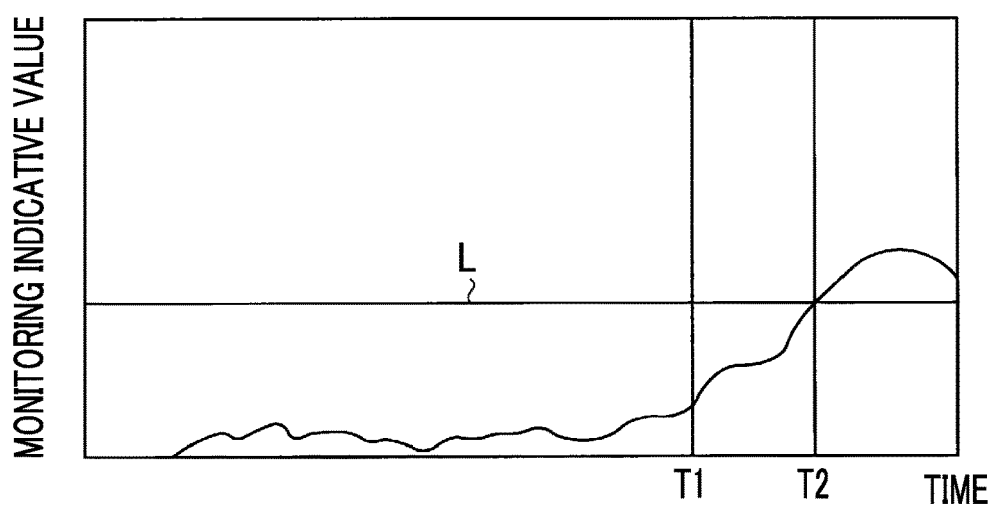
FIG. 2 is a diagram illustrating a temporal change of a monitoring indicative value.

FIG. 2 is a diagram illustrating a temporal change of a monitoring indicative value. As illustrated in FIG. 2, a threshold value L for determining whether or not there is an abnormality indication is set in the abnormality indication monitoring system 5 in advance, it is determined (detected) that there is an abnormality indication in a case where the monitoring indicative value exceeds the threshold value L, and it is determined (non-detected) that there is no abnormality indication in a case where the monitoring indicative value is equal to or smaller than the threshold value L. In a case where it is detected that there is an abnormality indication, the abnormality indication monitoring system 5 outputs a detection result of the abnormality indication to the abnormality diagnosis system 1.

Here, the abnormality indication monitoring system 5 outputs a measurement parameter in which a correlation value is an abnormal value (a correlation value exceeding the threshold value L) at an indication detection timing T2 and a measurement parameter in which a correlation value is an abnormal value at a non-detection timing T1 as abnormality indication detection results. The abnormality indication monitoring system 5 outputs a parameter transition and a parameter contribution in a monitoring period from the non-detection timing T1 to the indication detection timing T2 as abnormality indication detection results.

The indication detection timing T2 is a timing at which an abnormality indication is detected by the abnormality indication monitoring system 5. Here, FIG. 4 is a diagram illustrating a list of measurement parameters in which a correlation value is an abnormal value at the indication detection timing. FIG. 4 illustrates two measurement parameters having a correlation, and a first measurement parameter is correlated with a second measurement parameter. As illustrated in FIG. 4, the number of correlations having abnormal values at the indication detection timing T2 is, for example, six.

The non-detection timing T1 is a timing earlier than the indication detection timing T2, and is an initial timing at which a monitoring indicative value greatly changes. Here, FIG. 3 is a diagram illustrating a list of measurement parameters in which a correlation value is an abnormal value at the non-detection timing. In the same manner as in FIG. 4, also in FIG. 3, the first measurement parameter is correlated with the second measurement parameter. As illustrated in FIG. 3, the number of correlations having abnormal values at the non-detection timing T1 is, for example, three.

The parameter transition is a transition of a measurement parameter in which a correlation value is an abnormal value in the monitoring period from the non-detection timing T1 to the indication detection timing T2. If a parameter transition from FIG. 3 to FIG. 4 is observed, abnormality occurs in a correlation value centering on a measurement parameter of "OO line outlet flow rate".

The parameter contribution is a measurement parameter which contributes to detection of an abnormality indication in the monitoring period from the non-detection timing T1 to the indication detection timing T2, and is, specifically, a measurement parameter which contributes to a transition in a monitoring indicative value in the monitoring period from the non-detection timing T1 to the indication detection timing T2. Here, FIG. 5 is a diagram illustrating a parameter contribution. As illustrated in FIG. 5, the parameter contribution is ranked so that the rank of a measurement parameter whose contribution is great is high, and the rank of a measurement parameter whose contribution is small is low. The abnormality indication monitoring system 5 derives a parameter contribution by analyzing a measurement parameter which changes in the monitoring period from the non-detection timing T1 to the indication detection timing T2. As illustrated in the parameter transition from FIG. 3 to FIG. 4, if measurement parameters at the non-detection timing T1 and the indication detection timing T2 are compared with each other, it can be seen that most of the measurement parameters related to abnormal correlation values are "OO line outlet flow rate", and an abnormal correlation value is generated centering on the measurement parameter of "OO line outlet flow rate". Thus, as illustrated in FIG. 5, regarding a parameter contribution, the contribution of "OO line outlet flow rate" is great.

In FIGS. 3 to 5, a measurement parameter in which a correlation value is an abnormal value in common at the non-detection timing T1 and the indication detection timing T2 is illustrated to be shaded.

Information regarding a system is added to a measurement parameter in which an abnormality indication is detected, and thus the abnormality indication monitoring system 5 determines whether or not a measurement parameter having an abnormal value is located on the same system.

Next, with reference to FIG. 1 again, the abnormality diagnosis system 1 will be described. As illustrated in FIG. 1, the abnormality diagnosis system 1 includes a database 10 and an abnormality diagnosis control unit 11.

The database 10 is formed by using a hardware resource such as a storage device, and stores various pieces of information generated on the basis of the past operation history of the nuclear power plant. Specifically, the database 10 stores an abnormality event of the nuclear power generation plant, an abnormality indication facility correlated with the abnormality event, and an abnormality countermeasure correlated with the abnormality event. The database 10 stores a parameter transition for determination correlated with the abnormality event and a parameter contribution for determination correlated with the abnormality event, and the parameter transition for determination and the parameter contribution for determination are generated on the basis of the past operation history of the nuclear power generation plant.

The abnormality diagnosis control unit 11 acquires an abnormality indication detection result from the abnormality indication monitoring system 5. The abnormality diagnosis control unit 11 compares or collates (that is, performed matching determination) the acquired abnormality indication detection result with the above-described various pieces of information stored in the database 10, so as to specify an abnormality event or the like of the nuclear power generation plant.

If abnormality indication detection results are acquired, the abnormality diagnosis control unit 11 compares a parameter transition, a parameter contribution, and a position on a system of a measurement parameter included in the abnormality indication detection results with a parameter transition, a parameter contribution, and a position on the system of the measurement parameter stored in the database 10, respectively. If there are a parameter transition, a parameter contribution, and a position on the system of the measurement parameter matching the abnormality indication detection results as comparison results, the abnormality diagnosis control unit specifies an abnormality event correlated with the matching parameter transition, parameter contribution, and position on the system of the measurement parameter. The abnormality diagnosis control unit 11 specifies an abnormality indication facility and an abnormality countermeasure correlated with the specified abnormality event.

Regarding a process for increasing the accuracy of matching determination, there may be an addition of a function in which, in a case where a measurement parameter (for example, a measurement parameter whose contribution is great) serving as a cause of an abnormality indication is specified during matching determination, a parameter transition of the specified measurement parameter is automatically compared with a parameter transition (trend) of the measurement parameter in the past abnormality indication by the abnormality diagnosis control unit 11, and it is checked whether or not a comparison result indicates matching. A function of displaying and prioritizing a cause of an abnormality indication on the basis of the certainty (reliability) of matching determination may be provided.

Here, in a case where there are a plurality of specified abnormality events, the abnormality diagnosis control unit 11 ranks the plurality of abnormality events on the basis of an appearance frequency of a measurement parameter having an abnormal value between the non-detection timing T1 and the indication detection timing T2, or the magnitude of a correlation value of a measurement parameter having an abnormal value. FIG. 6 is a diagram illustrating a plurality of specified abnormality events. As illustrated in FIG. 6, in a case where there are a plurality of specified abnormality events, the abnormality diagnosis control unit 11 generates data in which the plurality of abnormality events are correlated with ranks thereof.

FIG. 7 is a diagram illustrating abnormality indication facilities, and FIG. 8 is a diagram illustrating abnormality countermeasures. In a case where there are a plurality of specified abnormality indication facilities, the abnormality diagnosis control unit 11 generates data in which the plurality of abnormality indication facilities are correlated with ranks thereof in the same manner as in ranking of abnormality events. In a case where there are a plurality of abnormality countermeasures correlated with a specified abnormality event, the abnormality diagnosis control unit 11 ranks the plurality of abnormality countermeasures on the basis of the past maintenance history of the nuclear power generation plant. As illustrated in FIG. 8, if an abnormality event is specified, the abnormality diagnosis control unit 11 outputs a countermeasure with a high rank among a plurality of abnormality countermeasures illustrated in FIG. 8 as a diagnosis result.

If an abnormality event is specified, the abnormality diagnosis control unit 11 outputs a centralized monitoring instruction signal for giving an instruction for centralized monitoring of a measurement parameter correlated with the specified abnormality event, to the abnormality indication monitoring system 5. FIG. 9 is a diagram illustrating a centralized monitoring instruction signal. The centralized monitoring instruction signal is a signal correlated with a plurality of measurement parameters centrally monitored as illustrated in FIG. 9, for example. If the centralized monitoring instruction signal is acquired, the abnormality indication monitoring system 5 centrally monitors a plurality of measurement parameters centrally monitored.

As mentioned above, according to the present embodiment, the abnormality diagnosis system 1 can specify an abnormality event of the nuclear power generation plant by using an abnormality indication detection result in the abnormality indication monitoring system 5 and the past operation history of the nuclear power generation plant.

According to the present embodiment, the abnormality diagnosis control unit 11 can specify an appropriate abnormality countermeasure for a specified abnormality event.

According to the present embodiment, since the abnormality diagnosis control unit 11 outputs a centralized monitoring instruction signal to the abnormality indication monitoring system 5, the abnormality indication monitoring system 5 can centrally monitor a measurement parameter correlated with an abnormality event, and can thus further enhance monitoring of the measurement parameter.

The abnormality diagnosis control unit 11 of the present embodiment may predict the development of a plurality of measurement parameters after an indication detection timing on the basis of a specified abnormality event. For example, the abnormality diagnosis control unit 11 generates a prediction model on the basis of the past operation history of a nuclear power generation plant corresponding to an abnormality event. If an abnormality event is specified, the abnormality diagnosis control unit 11 predicts the development of a plurality of measurement parameters after the indication detection timing T2 by using the generated prediction model. According to the above configuration, the abnormality diagnosis control unit 11 predicts the development of a plurality of measurement parameters, and can thus predict time until abnormality occurs in the nuclear power generation plant from detection of an abnormality indication of the nuclear power generation plant. Therefore, it is possible to take an abnormality countermeasure for a specified abnormality event at an appropriate time before abnormality occurs in the nuclear power generation plant.

REFERENCE SIGNS LIST

1 ABNORMALITY DIAGNOSIS SYSTEM
5 ABNORMALITY INDICATION MONITORING SYSTEM
10 DATABASE
11 ABNORMALITY DIAGNOSIS CONTROL UNIT

The invention claimed is:

1. An abnormality diagnosis system diagnosing an abnormality event of a nuclear power plant based on of abnormality indication detection results acquired by an abnormality indication monitoring system detecting an abnormality indication of the nuclear power plant by monitoring indicative value summing up correlation values between two measurement parameters out a plurality of measurement parameters measured in the nuclear power plant for all combinations of said two measurement parameters, when the monitoring indicative value goes over a threshold value L at a first certain time T2, the first certain time T2 is set as an indication detection timing T2, the correlation values have respective abnormal values and when at least one of the correctional values indicates its own abnormal value at a second certain time T1 before the indication detection timing T2, the second certain time T1 is set as a non-detection timing T1, and an monitoring period is set as a period from the non-detection timing T1 to the indication detection timing T2 the abnormality indication detection results include, when the abnormality indication is detected, parameter transitions and parameter contributions, wherein the parameter transitions are temporal transitions of the two measurement parameters relating to the correlation value indication its own abnormal value in the monitoring period, and the parameter contributions are degrees of contribution of respective measurement parameters to a temporal change of the monitoring indicative value during the monitoring period, the parameter contributions are degrees of contribution of respective measurement parameters to a temporal change of the monitoring indicative value during the monitoring period, the abnormality diagnosis system comprising:

an abnormality diagnosis control unit configured to acquire the abnormality indication detection results from the abnormality indication monitoring system, and a database configured to store a plurality of previous abnormality events of the nuclear power plant having occurred in the past, at least one previous abnormality indication facility that indicates signs of abnormality in the nuclear power plant, correlated with one or more among the plurality of the previous abnormality events, previous parameter transitions related to one or more among the plurality of the previous abnormality events of the nuclear power plant based on an operation history of the nuclear power plant and in the past, and the previous parameter contributions related to one or more among the plurality of the previous abnormality events of the nuclear power plant based on the operation history, wherein the abnormality diagnosis control unit is configured to specify, when determining the parameter transitions match with the previous parameter transitions and the parameter contributions match with the previous parameter contributions, an abnormality event and an abnormality indication facility correlated with the matched previous parameter transitions and the matched previous parameter contributions.

2. The abnormality diagnosis system according to claim 1, wherein the database is further configured to store countermeasures against the respective abnormality events stored in the database, and the abnormality diagnosis control unit is further configured to specify at least one of the countermeasure against the specified abnormality events.

3. The abnormality diagnosis system according to claim 2, wherein the abnormality diagnosis control unit is configured to predict temporal development of the plurality of the measurement parameters related to the specified abnormality event after the indication detection timing (T2).

4. The abnormality diagnosis system according to claim 2, wherein the abnormality diagnosis control unit in configured to output a centralized monitoring instruction signal for centralized monitoring of the measurement parameters correlated with the specified abnormality event, to the abnormality indication monitoring system.

5. The abnormality diagnosis system according to claim 3, wherein the abnormality diagnosis control unit in configured to output a centralized monitoring instruction signal for centralized monitoring of the measurement parameters correlated with the specified abnormality event, to the abnormality indication monitoring system.

6. The abnormality diagnosis system according to claim 1, wherein the abnormality diagnosis control unit in configured to output a centralized monitoring instruction signal for centralized monitoring of the measurement parameters correlated with the specified abnormality event, to the abnormality indication monitoring system.

* * * * *